(12) United States Patent
Hwang et al.

(10) Patent No.: US 9,137,053 B2
(45) Date of Patent: Sep. 15, 2015

(54) APPARATUS AND METHOD OF ESTIMATING CHANNEL IN CONSIDERATION OF RESIDUAL SYNCHRONIZATION OFFSET

(71) Applicant: Electronics and Telecommunications Research Institute, Daejeon (KR)

(72) Inventors: Sung-Hyun Hwang, Daejeon (KR); Jung-Sun Um, Daejeon (KR); Sung-Jin Yoo, Daejeon (KR); Byung-Jang Jeong, Daejeon (KR); Myung-Sun Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/311,579

(22) Filed: Jun. 23, 2014

(65) Prior Publication Data

US 2015/0092871 A1   Apr. 2, 2015

(30) Foreign Application Priority Data

Oct. 1, 2013   (KR) .................. 10-2013-0117105

(51) Int. Cl.
*H04K 1/10*   (2006.01)
*H04L 27/28*   (2006.01)
*H04L 25/02*   (2006.01)

(52) U.S. Cl.
CPC .......... *H04L 25/0204* (2013.01); *H04L 25/022* (2013.01); *H04L 25/0232* (2013.01)

(58) Field of Classification Search
CPC ............ H04L 25/0204; H04L 25/0232; H04L 25/022

USPC ......................................................... 375/260
See application file for complete search history.

(56) References Cited

U.S. PATENT DOCUMENTS

| | | | |
|---|---|---|---|
| 7,729,434 B2 | 6/2010 | Arslan et al. | |
| 8,126,067 B2 * | 2/2012 | Hwang et al. | ................. 375/260 |
| 2009/0175367 A1 * | 7/2009 | Kishigami et al. | ............ 375/260 |
| 2009/0274174 A1 | 11/2009 | Hwang et al. | |

FOREIGN PATENT DOCUMENTS

| | | |
|---|---|---|
| KR | 101275806 B1 | 6/2013 |
| WO | 2007123364 A1 | 11/2007 |

\* cited by examiner

*Primary Examiner* — Erin File
(74) *Attorney, Agent, or Firm* — William Park & Associates Ltd.

(57) ABSTRACT

Disclosed herein are an apparatus and a method of estimating a channel in consideration of a residual synchronization offset. The apparatus of estimating a channel in consideration of a residual synchronization offset includes: a channel estimating unit estimating the channel using pilots scattered over a plurality of OFDM symbols and calculating a first channel estimated value as the estimation result, in the case in which an OFDM symbol estimating the channel and an OFDM symbol compensating for the channel are different from each other; and a phase reflecting unit calculating a phase generated by the residual synchronization offset in proportion to a difference between a channel estimation time and a channel compensation time, reflecting the calculated phase in the first channel estimated value, and calculating a second channel estimated value as the reflection result.

12 Claims, 5 Drawing Sheets

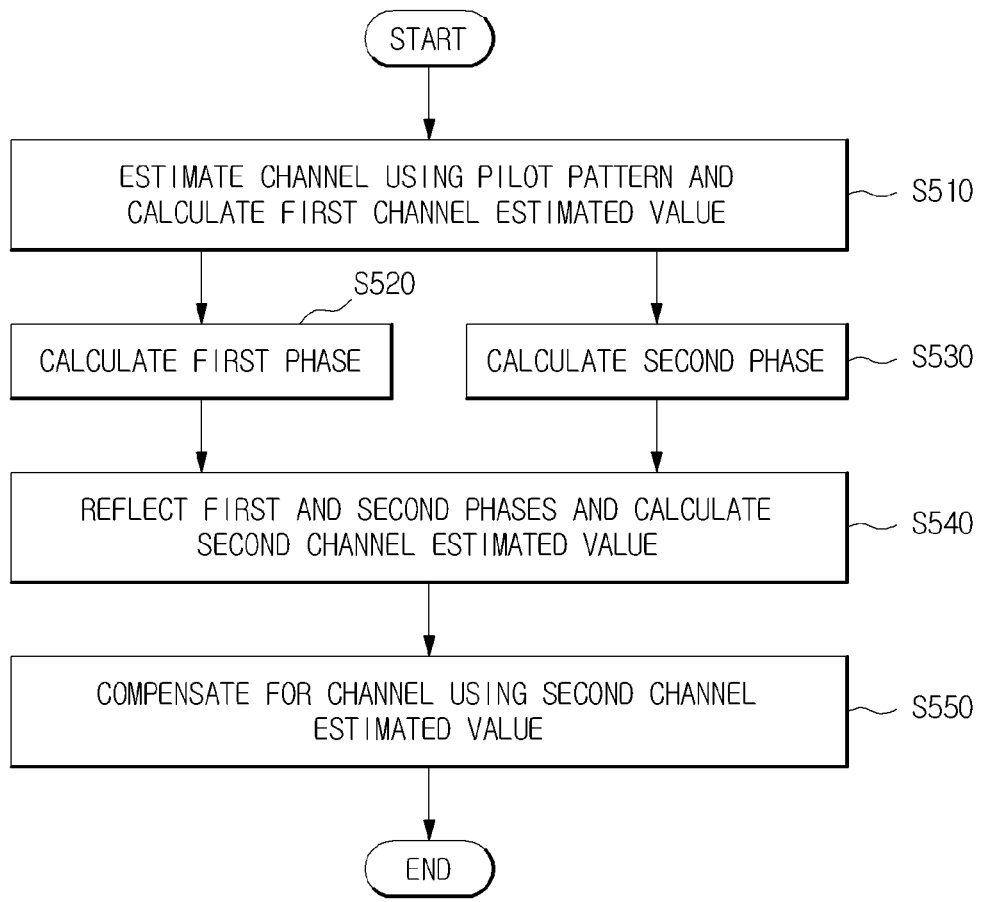

APPARATUS AND METHOD OF ESTIMATING CHANNEL IN CONSIDERATION OF RESIDUAL SYNCHRONIZATION OFFSET

CROSS REFERENCE TO RELATED APPLICATION

This application claims the benefit of Korean Patent Application No. 10-2013-0117105, filed on Oct. 1, 2013, 2013, entitled "Apparatus and Method of Estimating Channel in Consideration of Residual Synchronization Offset", which is hereby incorporated by reference in its entirety into this application.

BACKGROUND OF THE INVENTION

1. Technical Field

The present invention relates to a method of estimating a channel, and more particularly, to an apparatus and a method of estimating a channel in consideration of a residual synchronization offset in which a phase generated by the residual synchronization offset in proportion to a difference between a channel estimation time and a channel compensation time is reflected in a channel estimated value in the case in which an orthogonal frequency division multiplexing (OFDM) symbol estimating the channel and an OFDM symbol compensating for the channel are different from each other.

2. Description of the Related Art

In an orthogonal frequency division multiplexing (OFDM) transmission scheme, which is one of schemes of transmitting a plurality of carriers in which several carriers are used, input data are carried on a plurality of sub-carriers having orthogonality and are transmitted in parallel with each other.

In the OFDM transmission scheme, a transmission period in each channel is increased by the number of carriers. In this case, frequency selective channel characteristics appearing by using a wide band at the time of transmitting high speed data are approximated to frequency non-selective channel characteristics by a narrowed channel. Therefore, in the OFDM transmission scheme, distortion by a channel may be compensated for by only an equalizer of a single sample simpler than a single carrier system, such that the OFDM transmission scheme has been widely used in a high speed data transmission system of several fields such as multimedia data transmission, and the like.

In a system using the OFDM transmission scheme, a channel is estimated using a pilot sub-carrier. As a scheme of estimating a channel using a pilot sub-carrier, there are several schemes such as a linear minimum mean square error (LMMSE) scheme, which is a scheme of estimating a channel using statistical characteristics of the channel, a maximum likelihood (ML) scheme, which is a scheme of calculating an estimated value having a maximum likelihood value, a general linear and polynomial interpolation scheme, and the like.

The channel is estimated by one of these several schemes of estimating a channel and is then compensated for based on the estimated channel value.

However, in a scheme of estimating a channel according to the related art, an influence of a difference between an OFDM symbol estimating the channel and an OFDM symbol compensating for the channel and a residual synchronization offset generated by the difference is not considered in estimating the channel and compensating for the channel. That is, in the case in which the OFDM symbol estimating the channel and an OFDM symbol compensating for the channel are different from each other, channel estimating performance is deteriorated due to the residual synchronization offset.

SUMMARY OF THE INVENTION

An object of the present invention is to provide an apparatus and a method of estimating a channel in consideration of a residual synchronization offset in which a phase generated by the residual synchronization offset in proportion to a difference between a channel estimation time and a channel compensation time is reflected in a channel estimated value in the case in which an orthogonal frequency division multiplexing (OFDM) symbol estimating the channel and an OFDM symbol compensating for the channel are different from each other.

However, an object of the present invention is not limited to the object described above, and other objects that are not stated may be clearly understood by those skilled in the art from the following description.

According to an exemplary embodiment of the present invention, there is provided an apparatus of estimating a channel in consideration of a residual synchronization offset, including: a channel estimating unit estimating the channel using pilots scattered over a plurality of OFDM symbols and calculating a first channel estimated value as the estimation result, in the case in which an OFDM symbol estimating the channel and an OFDM symbol compensating for the channel are different from each other; and a phase reflecting unit calculating a phase generated by the residual synchronization offset in proportion to a difference between a channel estimation time and a channel compensation time, reflecting the calculated phase in the first channel estimated value, and calculating a second channel estimated value as the reflection result.

The phase reflecting unit may calculate a first phase by a residual frequency offset and a sampling clock offset, calculate a second phase by the sampling clock offset, reflect the first and second phases in the first channel estimated value, and calculate the second channel estimated value as the reflection result.

The phase reflecting unit may calculate a phase rotation value of the residual synchronization offset converted into a channel compensation point in time based on the first and second phases, reflect the phase rotation value of the residual synchronization offset converted into the channel compensation point in time in the first channel estimated value, and calculate the second channel estimated value as the reflection result.

The first phase may be calculated by the following Equation:

$$\phi_1 = 2\pi f_0 (N_{FFT} + N_{GI})(1+\eta)T_S = 2\pi\varepsilon_f \cdot \left(\frac{N_{FFT}+N_{GI}}{N_{FFT}}\right) \cdot (1+\eta),$$

where $f_0$ indicates an RFO, $\eta$ indicates an SCO, $N_{FFT}$ indicates an FFT size, $N_{GI}$ indicates a GI size, $T_S$ indicates a sampling period, and $\varepsilon_f$ indicates an RFO normalized as a sub-carrier spacing.

The second phase may be calculated by the following Equation:

$$\phi_2 = 2\pi k \cdot \left(\frac{N_{FFT} + N_{GI}}{N_{FFT}}\right) \cdot \eta,$$

where $N_{FFT}$ indicates an FFT size, and $N_{GI}$ indicates a GI size.

The phase reflecting unit may include: a first phase calculator calculating the first phase by the residual frequency offset and the sampling clock offset; a second phase calculator calculating the second phase by the sampling clock offset; an adder summing the first and second phases; a first multiplier multiplying the summed value by a difference value between an OFDM symbol index estimating the channel and an OFDM symbol index compensating for the channel; and a second multiplier multiplying the phase rotation value of the residual synchronization offset converted into the channel compensation point in time, which is the multiplied value, by the first channel estimated value to output the second channel estimated value.

The apparatus of estimating a channel in consideration of a residual synchronization offset may further include a channel compensating unit compensating for the channel using the second channel estimated value calculated by the phase reflecting unit.

According to another exemplary embodiment of the present invention, there is provided a method of estimating a channel in consideration of a residual synchronization offset, including: a channel estimating step of estimating the channel using pilots scattered over a plurality of OFDM symbols and calculating a first channel estimated value as the estimation result, in the case in which an OFDM symbol estimating the channel and an OFDM symbol compensating for the channel are different from each other; and a phase reflecting step of calculating a phase generated by the residual synchronization offset in proportion to a difference between a channel estimation time and a channel compensation time, reflecting the calculated phase in the first channel estimated value, and calculating a second channel estimated value as the reflection result.

In the phase reflecting step, a first phase by a residual frequency offset and a sampling clock offset may be calculated, a second phase by the sampling clock offset may be calculated, the first and second phases may be reflected in the first channel estimated value, and the second channel estimated value may be calculated as the reflection result.

In the phase reflecting step, a phase rotation value of the residual synchronization offset converted into a channel compensation point in time may be calculated based on the first and second phases, the phase rotation value of the residual synchronization offset converted into the channel compensation point in time may be reflected in the first channel estimated value, and the second channel estimated value may be calculated as the reflection result.

The first phase may be calculated by the following Equation:

$$\phi_1 = 2\pi f_0 (N_{FFT} + N_{GI})(1 + \eta)T_S = 2\pi \varepsilon_f \cdot \left(\frac{N_{FFT} + N_{GI}}{N_{FFT}}\right) \cdot (1 + \eta),$$

where $f_0$ indicates an RFO, $\eta$ indicates an SCO, $N_{FFT}$ indicates an FFT size, $N_{GI}$ indicates a GI size, $T_S$ indicates a sampling period, and $\varepsilon_f$ indicates an RFO normalized as a sub-carrier spacing.

The second phase may be calculated by the following Equation:

$$\phi_2 = 2\pi k \cdot \left(\frac{N_{FFT} + N_{GI}}{N_{FFT}}\right) \cdot \eta,$$

where $N_{FFT}$ indicates an FFT size, and $N_{GI}$ indicates a GI size.

The phase reflecting step may include: a first phase calculating step of calculating the first phase by the residual frequency offset and the sampling clock offset; a second phase calculating step of calculating the second phase by the sampling clock offset; an adding step of summing the first and second phases; a first multiplying step of multiplying the summed value by a difference value between an OFDM symbol index estimating the channel and an OFDM symbol index compensating for the channel; and a second multiplying step of multiplying the phase rotation value of the residual synchronization offset converted into the channel compensation point in time, which is the multiplied value, by the first channel estimated value to output the second channel estimated value.

The method of estimating a channel in consideration of a residual synchronization offset may further include a channel compensating step of compensating for the channel using the second channel estimated value calculated in the phase reflecting step.

BRIEF DESCRIPTION OF THE DRAWINGS

FIG. 5 is a diagram showing a method of estimating a channel according to an exemplary embodiment of the present invention.

DESCRIPTION OF EXEMPLARY EMBODIMENTS

Figure 1:
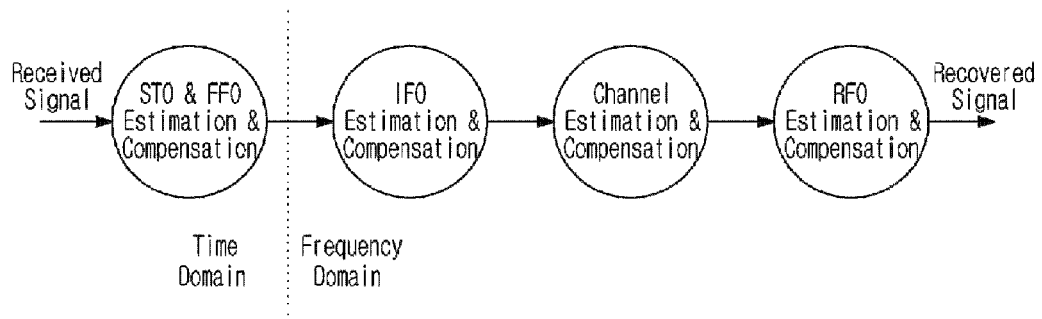
FIG. 1 is a diagram for describing synchronization and channel estimation principles in an IEEE 802.22 receiver.

Hereinafter, an apparatus and a method of estimating a channel in consideration of a residual synchronization offset according to an exemplary embodiment of the present invention will be described with reference to the accompanying drawings. Portions required for understanding an operation and an action according to the present invention will be described in detail.

Further, in describing components of the present invention, components having the same name may be denoted by different reference numerals in each of the drawings and be denoted by the same reference numerals in different drawings. However, even in this case, corresponding components may not have different functions in each of exemplary embodiments or may not have the same function in different exemplary embodiments, and functions of the respective components should be judged based on a description of the respective components in corresponding exemplary embodiments.

Particularly, the present invention suggests a new method of estimating a channel in consideration of a residual synchronization offset in which a phase generated by the residual synchronization offset in proportion to a difference between a channel estimation time and a channel compensation time is reflected in a channel estimated value in the case in which an orthogonal frequency division multiplexing (OFDM) symbol estimating the channel and an OFDM symbol compensating for the channel are different from each other.

FIG. 1 is a diagram for describing synchronization and channel estimation principles in an IEEE 802.22 receiver.

As shown in FIG. 1, when a signal is received, the receiver may estimate and compensate for a symbol timing offset (STO) and a fractional frequency offset (FFO) in a time domain and then estimate and compensate for an integral frequency offset (IFO) in a frequency domain, using repetitive characteristics of superframes and frame preambles based on the received signal.

In this case, the receiver may estimate the FFO using a cyclic prefix (CP) depending on circumstances.

Next, the receiver may estimate and compensate for a channel value using a signal in which all of the STO, the FFO, and the IFO are compensated for.

Next, the receiver may estimate and compensate for a residual frequency offset (RFO) using a pilot sub-carrier of the channel compensated signal. That is, the receiver universally compensates for the channel value to minimize an inter-carrier interference (ICI) influence and then estimates the RFO.

Figure 2:
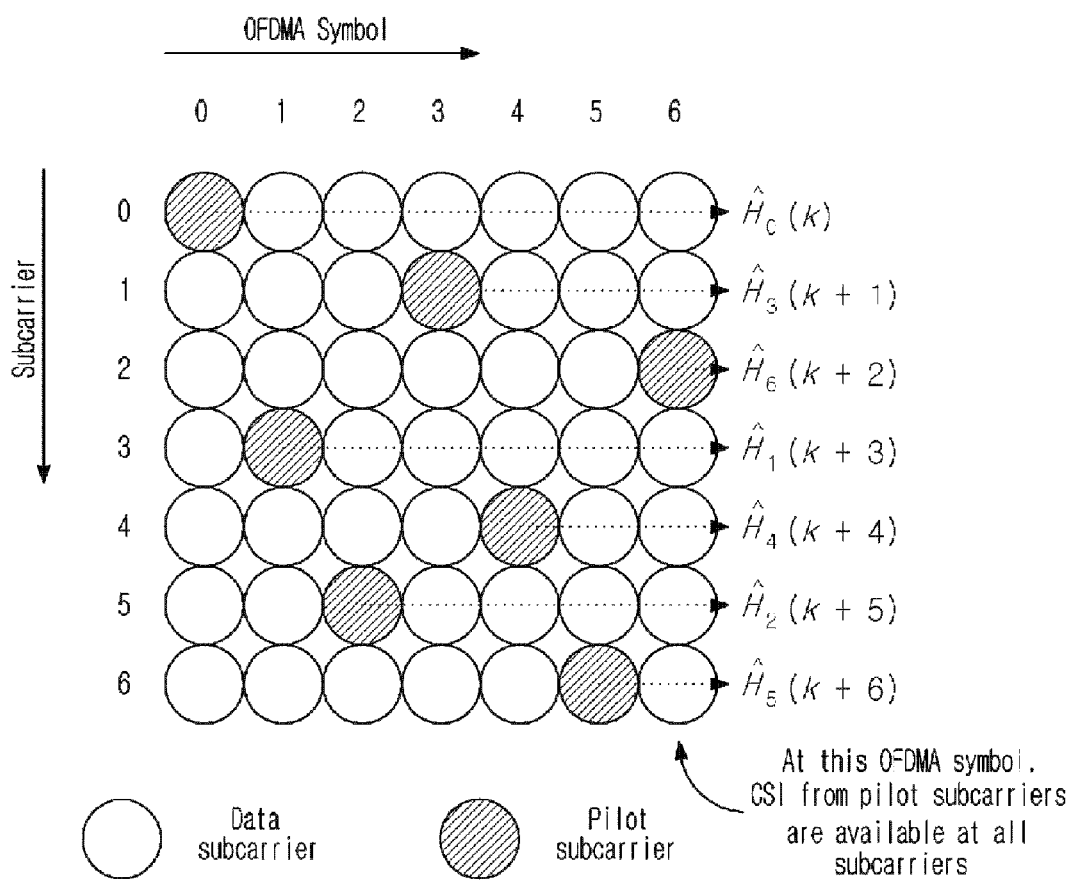
FIG. 2 is a diagram for describing a channel estimation principle using an IEEE 802.22 pilot pattern.

FIG. 2 is a diagram for describing a channel estimation principle using an IEEE 802.22 pilot pattern.

As shown in FIG. 2, the IEEE 802.22 pilot pattern is pilots scattered over several OFDM symbols, that is, a staggered pilot pattern or a scattered pilot pattern.

The IEEE 802.22 receiver using the staggered pilot pattern may obtain channel information at pilot sub-carrier positions during seven OFDM symbols and use the obtained channel information as channel estimated values of data sub-carriers, in order to maximize channel estimation performance.

That is, in a seventh OFDM symbol, channel information of pilot sub-carriers at positions of all data sub-carriers may be shared.

However, in the case in which the RFO is present, the received signal is subjected to phase rotation by an influence of the RFO and a sampling clock offset (SCO) in proportion to an OFDM symbol index. That is, since a phase difference corresponding to an OFDM symbol spacing due to the RFO remains between channel estimated values estimated from different OFDM symbols using the staggered pilot pattern such as the IEEE 802.22 pilot pattern, it should be considered.

A detailed description of this content will be provided below. A symbol (fast Fourier transform (FFT) output of the receiver) $Y_i(k)$ demodulated from a k-th sub-carrier of an i-th OFDM symbol may be defined by represented by the following Equation 1.

$$Y_i(k) = e^{j2\pi f_0 (iN_{SYM}+N_{GI})(1+\eta)T_S} \cdot e^{j2\pi f_0 T_d} \cdot e^{\frac{j2\pi k(iN_{SYM}+N_{GI})\eta}{N_{FFT}}} \quad \text{[Equation 1]}$$
$$e^{\frac{j2\pi k T_d}{N_{FFT} T_S}} \cdot e^{j\theta} \cdot \alpha \cdot X_i(k) \cdot H_i(k) + ICI + W_i(k)$$

Here, $f_0$ indicates an RFO and $f_0 = \beta(f_{rx} - f_{tx})$, and $\beta$ determines an RFO after compensating for a CFO.

$\eta$ indicates an SCO, and $T'_s = T_s + \Delta T = (1+\eta)T_s$, $\eta = (T'_s - T_s)/T_s$.

In addition, $T_d$ indicates a STO, $\theta$ indicates a phase offset, $\alpha$ indicates a magnitude offset or an automatic gain control (AGC) error, $N_{FFT}$ indicates an FFT size, $N_{GI}$ indicates a GI size, $N_{SYM}$ indicates $N_{FFT}+N_{GI}$, TS indicates a sampling period, $X_i(k)$ indicates a symbol transmitted on a k-th sub-carrier of an i-th OFDM symbol, $H_i(k)$ indicates a channel response on the k-th sub-carrier of the i-th OFDM symbol, $W_i(k)$ indicates an additive white Gaussian noise (AWGN) on the k-th sub-carrier of the i-th OFDM symbol, and ICI indicates inter-carrier interference.

First and third $e^{(\cdot)}$ terms of the above Equation 1 correspond to the phase rotation generated by the RFO and the SCO in proportion to the OFDM symbol index. That is, the first term, which is a phase rotation value by the RFO, $f_0$, the SCO, and $\eta$, is in proportion to the OFDM symbol index i, the third term, which is a phase rotation value by SCO and $\eta$, is in proportion to the sub-carrier index k and the OFDM symbol index i.

A phase $\phi_1$ rotated per OFDM symbol by the first term is represented by the following Equation 2.

$$\phi_1 = \quad \text{[Equation 2]}$$
$$2\pi f_0 (N_{FFT}+N_{GI})(1+\eta)T_S = 2\pi \varepsilon_f \cdot \left(\frac{N_{FFT}+N_{GI}}{N_{FFT}}\right) \cdot (1+\eta)$$

Here, $\varepsilon_f$ indicates an RFO normalized as a sub-carrier spacing. For example, $\varepsilon_f = f_0/f_{ss}$, where $f_{ss}$ indicates a sub-carrier spacing.

A phase $\phi_2$ rotated per OFDM symbol by the third term is represented by the following Equation 3.

$$\phi_2 = 2\pi k \cdot \left(\frac{N_{FFT}+N_{GI}}{N_{FFT}}\right) \cdot \eta \quad \text{[Equation 3]}$$

Figure 3:
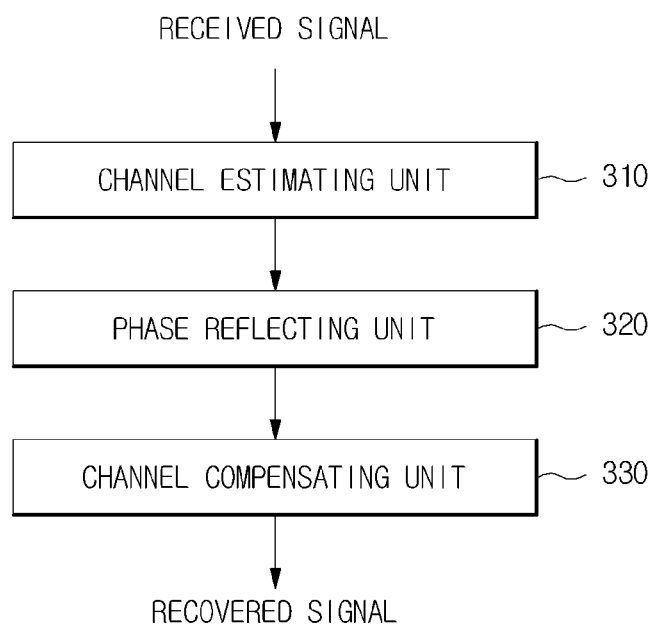
FIG. 3 is a diagram showing an apparatus of estimating a channel according to an exemplary embodiment of the present invention.

FIG. 3 is a diagram showing an apparatus of estimating a channel according to an exemplary embodiment of the present invention.

As shown in FIG. 3, the apparatus of estimating a channel according to an exemplary embodiment of the present invention may be configured to include a channel estimating unit 110, a phase reflecting unit 120, a channel compensating unit 130, and the like.

The channel estimating unit 110 may estimate a channel using pilots scattered over a plurality of OFDM symbols, that is, a staggered pilot pattern, and calculate a first channel estimated value as the estimation result.

The phase reflecting unit 120 may calculate a phase generated by a residual synchronization offset in proportion to a difference between a channel estimation time and a channel compensation time. That is, the phase reflecting unit 120 may calculate a first phase by a residual frequency offset and a sampling clock offset and calculate a second phase by the sampling clock offset.

The phase reflecting unit 120 may reflect the first and second phases in a first channel estimated value and calculate a second channel estimated value by removing an influence of the residual offset as the reflection result.

The channel compensating unit 130 may compensate for the channel using the second channel estimated value.

Figure 4:
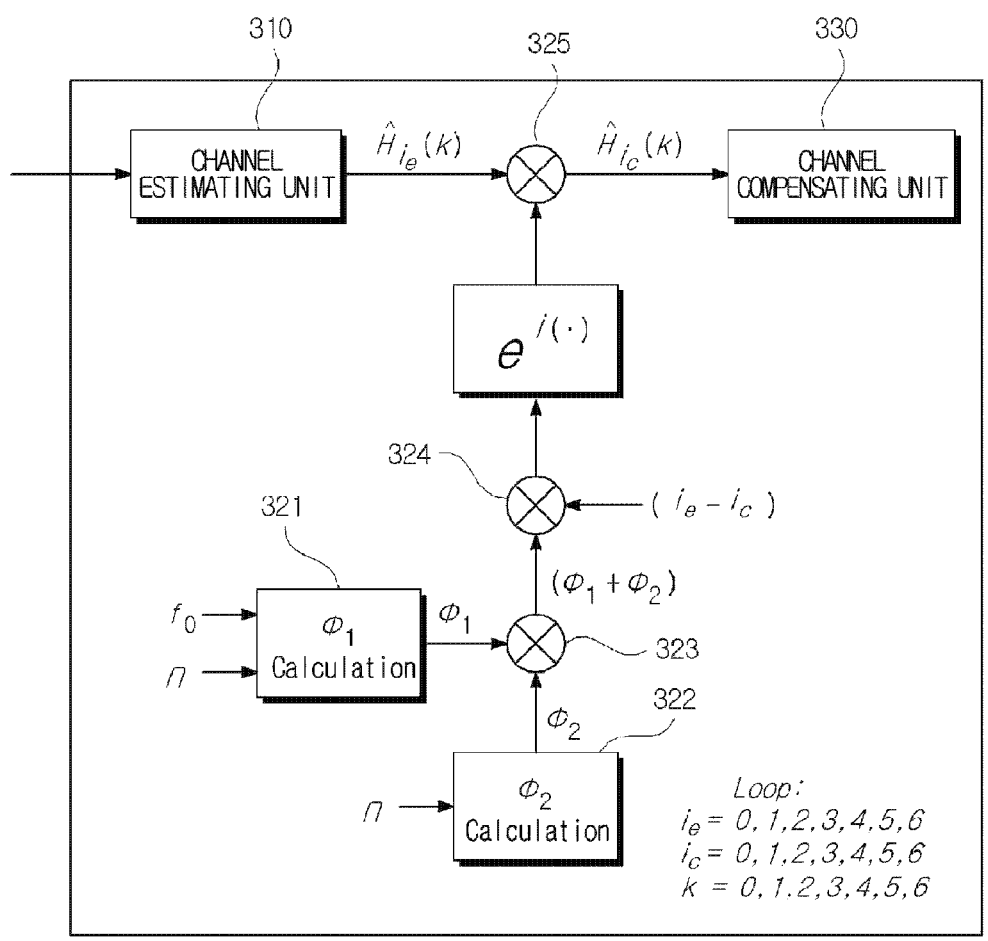
FIG. 4 is a diagram for describing a channel estimation principle according to an exemplary embodiment of the present invention.

FIG. 4 is a diagram for describing an operation principle of a phase reflecting unit according to an exemplary embodiment of the present invention.

As shown in FIG. 4, the channel estimating unit 110 may first estimate the channel using the staggered pilot pattern and calculate the first channel estimated value $\hat{H}_{i_e}(k)$ as the estimation result.

A first phase calculator 321 in the phase reflecting unit 320 may calculate the first phase $\phi_1$ by the residual frequency offset $f_O$ and the sampling clock offset $\eta$.

A second phase calculator 322 in the phase reflecting unit 320 may calculate the second phase $\phi_2$ by the sampling clock offset $\eta$.

An adder 323 in the phase reflecting unit 320 may sum the first and second phases $\phi_1$ and $\phi_2$.

A first multiplier 323 in the phase reflecting unit 320 may multiply the summed value $(\phi_1+\phi_2)$ by a difference value $(i_e-i_c)$ between an OFDM symbol index estimating the channel and an OFDM symbol index compensating for the channel and calculate a phase rotation value $(e^{j(\cdot)})$ of the residual synchronization offset converted into a channel compensation point in time as the multiplication result.

A second multiplier 324 in the phase reflecting unit 320 may multiply the calculated phase rotation value $(e^{j(\cdot)})$ of the residual synchronization offset converted into the channel compensation point in time by the first channel estimated value $\hat{H}_{i_e}(k)$ and calculate the second channel estimated value as the multiplication result.

Since the OFDM symbol indices compensating for the channel are the same as each other, but the OFDM symbol indices estimating the channel are different from each other in each pilot, as describe above, different phase rotation values by the RFO and the SCO may be reflected in the channel estimated values. Therefore, in the present invention, this influence may be removed from the channel estimated values.

That is, a scheme of estimating and compensating for the RFO and the SCO in the OFDM symbols has been used in the related art, while a scheme of removing a relative phase difference by the RFO and the SCO between the OFDM symbols is used in the present invention. The RFO and the SCO is subjected to a removing process after the channel is compensated for.

The channel compensating unit 130 may compensate for the channel using the second channel estimated value $\hat{H}_{i_e}(k)$.

FIG. 5 is a diagram showing a method of estimating a channel according to an exemplary embodiment of the present invention.

As shown in FIG. 5, an apparatus of estimating a channel according to an exemplary embodiment (hereinafter, referred to as a channel estimating apparatus) may estimate the channel using pilots scattered over the plurality of OFDM symbols, that is, the staggered pilot pattern, and calculate the first channel estimated value as the estimation result (S510).

Next, the channel estimating apparatus may calculate the first phase by the residual frequency offset and the sampling clock offset (S520), and calculate the second phase by the sampling clock offset (S530).

Then, the channel estimating apparatus may calculate the phase rotation value of the residual synchronization offset converted into the channel compensation point in time based on the first and second phases, reflect the phase rotation value of the residual synchronization offset converted into the channel compensation point in time in the first channel estimated value, and calculate the second channel estimated value by removing the influence of the residual offset as the reflection result (S540).

Next, the channel estimating apparatus may compensate for the channel using the second channel estimated value (S550).

Therefore, according to exemplary embodiments of the present invention, the phase generated by the residual synchronization offset in proportion to the difference between the channel estimation time and the channel compensation time is reflected in the channel estimated value in the case in which the OFDM symbol estimating the channel and the OFDM symbol compensating for the channel are different from each other, such that an influence of the residual synchronization offset is removed, thereby making it possible to calculate a more accurate channel estimated value.

Further, according to exemplary embodiments of the present invention, the influence of the residual synchronization offset is removed to calculate the more accurate channel estimated value, thereby making it possible to prevent performance deterioration of a system.

Meanwhile, although it has been mentioned that all components configuring the exemplary embodiment of the present invention described hereinabove are combined with each other as one component or are combined and operated with each other as one component, the present invention is not necessarily limited to the above-mentioned exemplary embodiment. That is, all the components may also be selectively combined and operated with each other as one or more component without departing from the scope of the present invention. In addition, although each of all the components may be implemented by one independent hardware, some or all of the respective components which are selectively combined with each other may be implemented by a computer program having a program module performing some or all of functions combined with each other in one or plural hardware. In addition, the computer program as described above may be stored in computer readable media such as a universal serial bus (USB) memory, a compact disk (CD), a flash memory, or the like, and be read and executed by a computer to implement the exemplary embodiment of the present invention. An example of the computer readable media may include magnetic recording media, optical recording media, carrier wave media, and the like.

The exemplary embodiments of the present invention described hereinabove are only an example of the present invention and may be variously modified and altered by those skilled in the art to which the present invention pertains without departing from essential features of the present invention. Accordingly, the exemplary embodiments disclosed in the present invention do not limit but describe the spirit of the present invention, and the scope of the present invention is not limited by the exemplary embodiments. The scope of the present invention should be interpreted by the following claims and it should be interpreted that all spirits equivalent to the following claims fall within the scope of the present invention.

What is claimed is:

1. An apparatus configured for estimating a channel by considering a residual synchronization offset, the apparatus comprising:

a channel estimating unit configured to estimate the channel using pilots scattered over a plurality of orthogonal frequency division multiplexing (OFDM) symbols and calculate a first channel estimated value as the estimation result, when an OFDM symbol for which channel estimation has been performed and an OFDM symbol for which channel compensation needs to be performed are different from each other;

a phase reflecting unit configured to calculate a phase generated by the residual synchronization offset in proportion to a difference between a channel estimation time and a channel compensation time, and calculate a second channel estimated value by reflecting the calculated phase in the first channel estimated value; and a channel compensating unit configured to compensate for the channel using the second channel estimated value.

2. The apparatus of claim 1, wherein the phase reflecting unit calculates a first phase by a residual frequency offset and a sampling clock offset, calculates a second phase by the sampling clock offset and calculates the second channel estimated value by reflecting the first and second phases in the first channel estimated value.

3. The apparatus of claim 2, wherein the phase reflecting unit calculates a phase rotation value of the residual synchronization offset of a channel compensation time based on the first and second phases and calculates the second channel estimated value by reflecting the phase rotation value in the first channel estimated value.

4. The apparatus of claim 3, wherein the first phase is calculated by the following Equation:

$$\phi_1 = 2\pi f_0 (N_{FFT} + N_{GI})(1+\eta)T_S = 2\pi \varepsilon_f \cdot \left(\frac{N_{FFT} + N_{GI}}{N_{FFT}}\right) \cdot (1+\eta),$$

where $f_0$ indicates a residual frequency offset (RFO), $\eta$ indicates a sampling clock offset (SCO), $N_{FFT}$ indicates an FFT size, $N_{GI}$ indicates a guard interval (GI) size, $T_s$ indicates a sampling period, and $\varepsilon_f$ indicates an RFO normalized as a sub-carrier spacing.

5. The apparatus of claim 3, wherein the second phase is calculated by the following Equation:

$$\phi_2 = 2\pi k \cdot \left(\frac{N_{FFT} + N_{GI}}{N_{FFT}}\right) \cdot \eta,$$

where $N_{FFT}$ indicates an FFT size, and $N_{GI}$, indicates a guard interval (GI) size.

6. The apparatus of claim 3, wherein the phase reflecting unit includes:
a first phase calculator configured to calculate the first phase by the residual frequency offset and the sampling clock offset;
a second phase calculator configured to calculate the second phase by the sampling clock offset;
an adder configured to sum the first and second phases;
a first multiplier configured to multiply the summed value by a difference value between an index of OFDM symbol for which channel estimation has been performed and an index of OFDM symbol for which channel compensation needs to be performed; and
a second multiplier configured for multiplying the phase rotation value of the residual synchronization offset of the channel compensation time, which is—the multiplied value, by the first channel estimated value to output the second channel estimated value.

7. A method for estimating a channel by considering a residual synchronization offset, the method comprising:
estimating the channel using pilots scattered over a plurality of OFDM symbols and calculating a first channel estimated value as the estimation result, when an OFDM symbol for which channel estimation has been performed and an OFDM symbol for which channel compensation needs to be performed are different from each other;
calculating a phase generated by the residual synchronization offset in proportion to a difference between a channel estimation time and a channel compensation time, and calculating a second channel estimated value by reflecting the calculated phase in the first channel estimated value; and ;and
compensating for the channel using the second channel estimated value.

8. The method of claim 7, wherein the calculating of the channel and the calculating of the second channel estimated value comprises:
calculating a first phase by a residual frequency offset and a sampling clock offset;
calculating a second phase by the sampling clock offset; and
calculating the second channel estimated value by reflecting the first and second phases in the first channel estimated value.

9. The method of claim 8, wherein the calculating of the channel and the calculating of the second channel estimated value comprises:
calculating a phase rotation value of the residual synchronization offset of a channel compensation time based on the first and second phases; and
calculating the second channel estimated value by reflecting the phase rotation value in the first channel estimated value.

10. The method of claim 9, wherein the first phase is calculated by the following Equation:

$$\phi_1 = 2\pi f_0 (N_{FFT} + N_{GI})(1+\eta)T_S = 2\pi \varepsilon_f \cdot \left(\frac{N_{FFT} + N_{GI}}{N_{FFT}}\right) \cdot (1+\eta),$$

where $f_0$ indicates a residual frequency offset (RFO), $\eta$ indicates a sampling clock offset (SCO), $N_{FFT}$ indicates an FFT size, $N_{GI}$ indicates a guard interval (GI) size, $T_s$ indicates a sampling period, and $\varepsilon_f$ indicates a RFO normalized as a sub-carrier spacing.

11. The method of claim 9, wherein the second phase is calculated by the following Equation:

$$\phi_2 = 2\pi k \cdot \left(\frac{N_{FFT} + N_{GI}}{N_{FFT}}\right) \cdot \eta,$$

where $N_{FFT}$ indicates an FFT size, and $N_{GI}$, indicates a guard interval (GI)size.

12. The method of claim 9, wherein the calculating of the channel and the calculating of the second channel estimated value comprises:
calculating step of calculating the first phase by the residual frequency offset and the sampling clock offset;
calculating step of calculating the second phase by the sampling clock offset;
summing the first and second phases;
multiplying the summed value by a difference value between an index of OFDM symbol for which channel estimation has been performed and an index of OFDM symbol for which channel compensation needs to be performed; and
multiplying the phase rotation value of the residual synchronization offset of the channel compensation time, which is the multiplied value, by the first channel estimated value to output the second channel estimated value.

* * * * *